United States Patent

[11] 3,600,523

[72] Inventor Eduard Schuller
Berlin, Germany
[21] Appl. No. 763,560
[22] Filed Sept. 30, 1968
[45] Patented Aug. 17, 1971
[73] Assignee Telefunken Patentverwertungsgesellschaft m.b.H.
Ulm/Danube, Germany
[32] Priority Sept. 29, 1967
[33] Germany
[31] P 15 72 529.8

[54] REPRODUCTION PROCESS FOR MAGNETIC TAPES

11 Claims, 2 Drawing Figs.

[52] U.S. Cl. .......... 179/100.2
E, 179/100.2 A, 179/100.1 A
[51] Int. Cl. .......... G11b 5/86
[50] Field of Search .......... 179/100.2
E, 100.1 A, 100.2 A; 346/74 MC, 74 M, 74 MT; 274/3, 4, 41.4

[56] References Cited

UNITED STATES PATENTS

| | | | |
|---|---|---|---|
| 1,815,010 | 7/1931 | Pollock et al. | 179/100.2 |
| 2,738,383 | 3/1956 | Herr et al. | 179/100.2 |
| 2,942,928 | 6/1960 | Levin | 346/74 |
| 3,144,520 | 8/1964 | Levin | 179/100.2 |
| 1,941,036 | 12/1933 | Lenk | 274/4 |
| 2,511,121 | 6/1950 | Murphy | 274/3 |
| 2,546,850 | 3/1951 | Chancenotte | 274/41.4 |
| 2,559,505 | 7/1951 | Hillier | 179/100.2 |

*Primary Examiner*—James W. Moffitt
*Attorney*—Spencer and Kaye

ABSTRACT: A contact reproduction process for magnetic tape recordings wherein information is first recorded on a tape, which forms the original, in the form of at least one strand of magnetizable material having cross-sectional variations provided therein. The original tape is then brought into contact with a blank tape and, subsequently, both tapes are exposed to a direct-current field and a high frequency field superimposed thereon. Since the original tape cannot be erased, it can be exposed to an optimum field intensity.

PATENTED AUG 17 1971 3,600,523

INVENTOR
Eduard Schüller

BY Spencer & Kaye
ATTORNEYS

REPRODUCTION PROCESS FOR MAGNETIC TAPES

BACKGROUND OF THE INVENTION

The present invention relates to a reproduction process for magnetic tapes and, more particularly, to an improved contact reproduction process for magnetic tapes.

One prior art process for reproducing magnetic tapes is to take a magnetic tape having a recording thereon and bringing it into contact with a blank tape in such a manner that both tapes, together, are exposed to a high frequency field.

This known process of contact reproduction, while being very economical, has the disadvantage of providing copies of inferior quality. This is due, on the one hand, to the field strength emanating from the original tape being of very low intensity and, on the other hand, the necessity for the high frequency field required for the duplication process to be of relatively low strength so that the original tape is not erased. Thus, the high frequency field is not strong enough to produce a sufficiently strong magnetization for a good copy. This method has thus not found acceptance in practice.

In practice the reproduction of recordings on magnetic tapes is generally accomplished by a method known as re-recording. Here the recording is re-recorded from the original tape on a plurality or reproduction tapes at a speed which is a multiple of the playback speed. The dual conversion of the recorded information necessitates at least two magnetic tape recorders which must meet the most exacting requirements in order to keep the loss in quality in the reproductions at a minimum.

This latter type of reproduction process is inferior, due to its time-consuming characteristic, to the reproduction process used for phonograph records. In the case of phonograph records, reproductions are made by simple and economical pressing or cutting processes. Therefore, many proposals have been put forth to construct magnetic recording carriers, for instance tapes, in such a manner, as to make their reproduction, like phonograph records, simple and more economical.

For instance, it has been proposed that information be recorded in the form of a mechanical depression in a grooved magnetic recording carrier. Such depression is provided in the magnetic layer at the bottom of the groove by means of a cutting stylus having a cutting edge which extends parallel to the groove bottom. The varying depth of the magnetic layer, which is thus provided, is activated by a direct-current field emanating from a scanning magnetic head guided at a constant height over the groove bottom, during playback. This induces a voltage in the winding of the magnetic head, which is proportional to the recorded information. Since the information is originally mechanically impressed, it is possible, upon production of suitable matrices by means of a pressing and cutting process, to make reproductions in the same manner as for grooved recording carriers which contain mechanically scanned recordings. This method, however, has the disadvantage of not being too effective, due to the distance between the scanning head and the magnetized surface.

Moreover, a magnetic head is required in order to activate the magnetic layer which is not available in conventional playback instruments. With respect to reproduction, any advantages to reproduction which may be derived from such process are only discernible when used with round recording carriers.

According to another known process, the original recording is produced on a tapelike carrier in the form of a photographic variable-width sound recording. Such a recording is then photochemically transferred to a printing block which is used to make reproductions by a printing process in which a finely distributed magnetic material is mixed into the printing ink. The magnetic ink mixture is then applied so that a stand of magnetizable material is produced on the tape copy. The information thus recorded is in the form of variations of the cross-sectional area of the recording track. Aside from the fact that here, too, the stand must be exposed, after duplication, to a steady field before playback can be accomplished, this process is very expensive, since it involves the photographic recording technique and the photochemical and printing-technical processes. Moreover, it is difficult to achieve a sufficient homogeneity of the magnetic layer and an unobjectionable contour sharpness of the variable-width sound recording in the printing process.

It has further been proposed to record the useful signal on a recording carrier by means of a mechanical depth recording with at 90° cutting stylus. If, according to one such embodiment, the recording direction is selected to be parallel to one side of a groove, this side remains unmodulated and a strip or ridge respectively remains between each modulated and unmodulated area. The cross section of such strip is modulated according to the course of the signal oscillations. If the recording carrier employed is a magnetic recording carrier, the playback can occur, after premagnetization by means of a steady field, with a conventional magnetic head. It is, however, also possible to make reproductions according to the older proposal by means of a matrix produced from the original recording in a pressing or cutting process. This latter is the process used for making conventional phonograph records. This has the disadvantage that the records, thus produced, must again be premagnetized for playback. This type of reproduction is also not well suited for tape-type recording carriers.

SUMMARY OF THE INVENTION

It is therefore an object of the present invention to provide a relatively simple and economical process for reproducing magnetic tapes having recordings thereon.

In brief, the present invention describes a process for contact reproduction of magnetic tape recordings in which information is recorded on a tape, which forms the original, in the form of at least one cross-sectionally varied strand of magnetizable material. Such original tape is then brought into contact with a blank tape and the two together are exposed to a direct-current field and a high frequency field superimposed thereon.

While a contact reproduction process is unsuitable for carriers provided with recordings in the form of variations in the residual magnetic intensity, its advantages can be fully utilized in cross-sectionally modulated carriers. Since the magnetic field used in the reproduction process can not erase the original recording, where cross-sectionally modulated carriers are utilized, optimum dimensions are possible. An additional direct-current field is necessary because the original recording carrier does not contain any residual magnetism. The expenditures required for processing apparatus to practice the present invention are relatively small, since the necessity for high-fidelity recording and playback instruments, required for the re-recording process, are eliminated.

A further advantage of the process, according to the present invention, when compared to the re-recording process is that multitrack recordings, i.e. recording carriers having a plurality of parallel, cross-sectionally modulated strands, can be reproduced without any additional expenditures and efforts.

Moreover, the process, according to the present invention, is superior to the printing process, because, in addition to its simplicity, normal magnetic tapes with a homogeneous magnetic layer can be used for reproductions and no difficulties arise with respect to the realization of the required sharp outlines. The reproductions can be played on any commercially available tape recorder. If the recording is no longer of interest, the carrier can be used in a conventional manner on any commercially available tape recorder for making new recordings.

The production of the original tape for the process according to the present invention is advisably accomplished by cutting a depth recording into a nonmagnetic carrier. The cutting stylus should have as wide an angle between its cutting sides as possible, preferably greater than 90°, so that a flat groove will result with outlines which form a double variable-width recording on the surface of the tape. The groove can then be filled with magnetic material, for example magnetic material, or an iron layer can be galvanically applied to the groove. Another possibility is to produce an information strand by impressing a mass of synthetic material mixed with magnetic powder into the groove.

The reproducing apparatus need only be a tape-drive mechanism and means for producing direct-current and high frequency fields. The direction of the field should here be perpendicular to the recording carrier surface. This has the advantage that the highest frequencies are reproduced particularly well during magnetic scanning.

DESCRIPTION OF THE PREFERRED METHOD

As discussed above, the present invention describes a process for contact reproduction of magnetic tape recordings in which information is recorded on a tape in the form of at least one cross-sectionally varied strand of magnetizable material. This tape then forms the original which is brought into contact with a blank tape and the two tapes together are exposed to a direct-current field and a high frequency field superimposed on the direct-current field.

Figure 1:
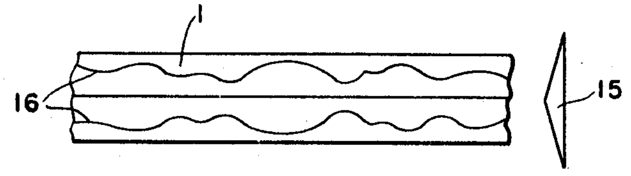
FIG. 1 is a plan view of a portion of the original recording tape, according to the present invention.

The process of the invention will best be understood when described in conjunction with the drawings. Referring first to FIG. 1, this is a plan view illustration of the original tape recording. As shown, a double variable-width recording in the form of groove 16 is cut into tape 1 by means of a cutting stylus 15 having an angle between its cutting sides greater than 90°. The groove 16, which is thus cut, can be filled with a magnetizable material, for example, magnetic material, or an iron layer which is galvanically applied to the top surface of the tape; hence, to the groove 16. The strand of magnetizable material can also be produced by impressing a mass of synthetic material mixed with magnetic powder into the groove 16.

Figure 2:
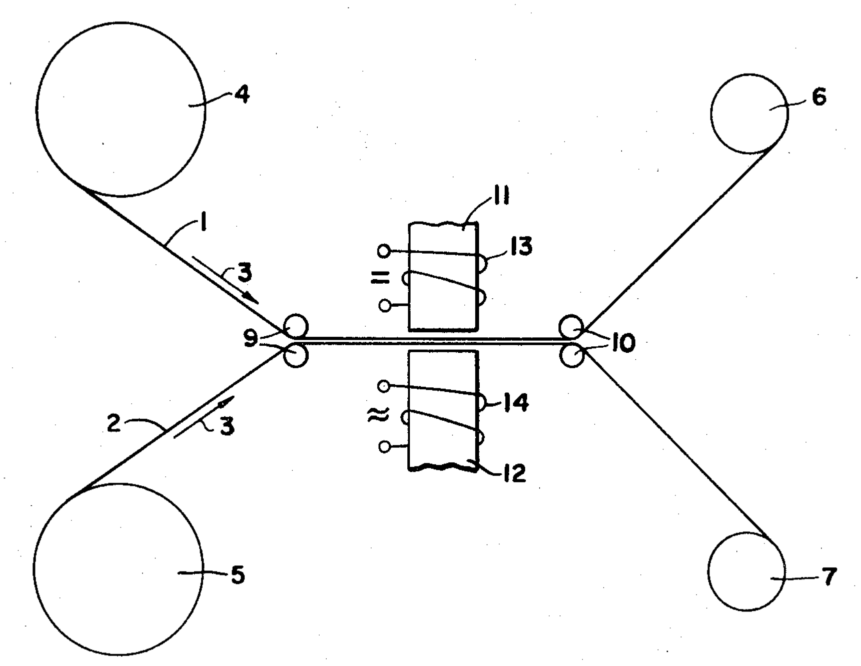
FIG. 2 is a schematic view of the means for reproducing a magnetic tape recording, according to the present invention.

Referring to FIG. 2, this shows schematically the actual reproduction of a tape recording. The original tape recording 1, having the recorded information thereon is brought into contact with a blank tape 2, onto which the information recorded on the original tape 1 is to be transferred. The two tapes 1 and 2 are moved in the direction of arrow 3, from the left-hand supply reels 4 and 5, respectively, to the right-hand receiving reels 6 and 7, respectively, by drive means (not shown). Between the pairs of guide rollers 9 and 10, respectively, the two tapes run parallel with respect to each other. Moreover, the two tapes are in direct contact with each other. This contact is produced by guide means (not shown). While in direct contact with each other, the tapes, as shown, are exposed together to a direct-current field on which there is superimposed a high frequency field. The means for producing these fields are indicated schematically in FIG. 2 as magnetic cores 11 and 12 having associated windings 13 and 14.

As previously mentioned, the practice of the process of contact reproduction of magnetic tape recordings, according to the present invention, is relatively simple and inexpensive.

Moreover, the original tape, which is produced by forming at least one strand of magnetizable material having cross-sectional variations provided therein, is such that the information recorded thereon can not be erased when exposed to optimized field intensity. This represents a significant improvement over prior art contact reproduction processes. Suitable methods for producing the strand of magnetic material are disclosed for instance or in published German Application No. 1,268,206.

The carrier containing the strand may be of any suitable material used for usual magnetic tapes. Its thickness must be such that even with high amplitudes of the cutting stylus the rearside of the carrier is not damaged. As blank tapes usual magnetic tapes may be used. The frequency range of recording information which can be recorded extends up to several megacycles.

It will be understood that the above-described of the present invention is susceptible to various modifications, changes and adaptations.

I claim:

1. Process for reproducing magnetic tapes comprising the steps of:

a. recording information on a tape in the form of at least one strand of magnetizable material having cross-sectional variations which represent information provided therein, said tape forming the original tape;

b. contacting said original tape with a blank tape; and c. simultaneously exposing said contacted tapes to a direct-current field having a high frequency field superimposed thereon as said tapes are moved relative to said superimposed fields, whereby the information recorded on said original tape is reproduced on said blank tape.

2. The process defined in claim 1 wherein said original and said blank tape are continuously moved through said superimposed direct current and high frequency fields in a direction perpendicular to the superimposed fields.

3. Process as defined in claim 1 wherein said step (*a*) is accomplished, at least in part, by cutting a groove into said tape with a mechanical depth recording means.

4. Process as defined in claim 3 wherein the cross-sectional area variations of said groove are transverse to the length of the tape.

5. Process as defined in claim 3 wherein said mechanical depth recording means is a cutting stylus having an angle between its cutting sides which is greater than 90°.

6. Process as defined in claim 5 wherein said stylus cuts a groove into a nonmagnetic tape and said strand is produced by filling the groove with magnetic material.

7. A process as defined in claim 6 wherein more than one of said strands is provided on said tape.

8. Process as defined in claim 5 wherein said stylus cuts a groove in a nonmagnetic tape and said strand is produced by filling the groove with synthetic material and magnetic powder.

9. A process as defined in claim 8 wherein more than one of said strands is provided on said tape.

10. A process as defined in claim 5 wherein said stylus cuts a groove in a nonmagnetic tape and said strand is produced by galvanically applying an iron layer to the top surface of said groove.

11. A process as defined in claim 10 wherein more than one of said strands is provided on said tape.